Sept. 29, 1931.  O. C. KAVLE  1,825,069
STAMPING MACHINE
Filed Sept. 29, 1928   3 Sheets-Sheet 3
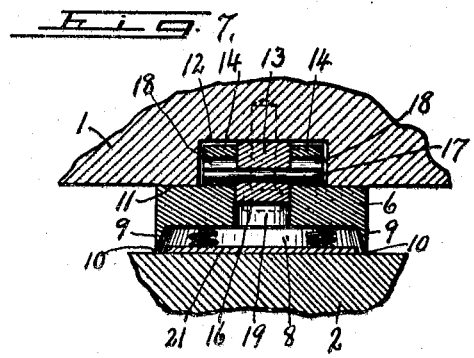
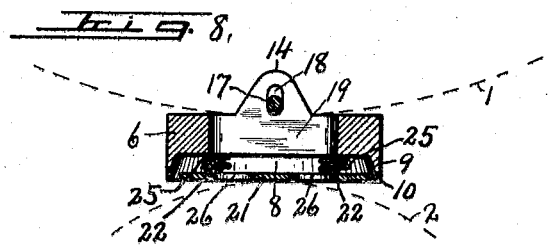
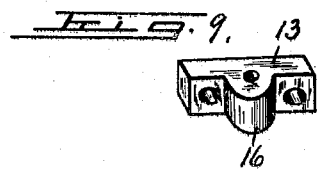
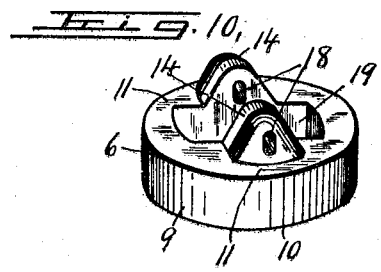
WITNESS
J. J. Mains
INVENTOR
O. C. Kavle
BY
Denison & Thompson
ATTORNEYS Patented Sept. 29, 1931

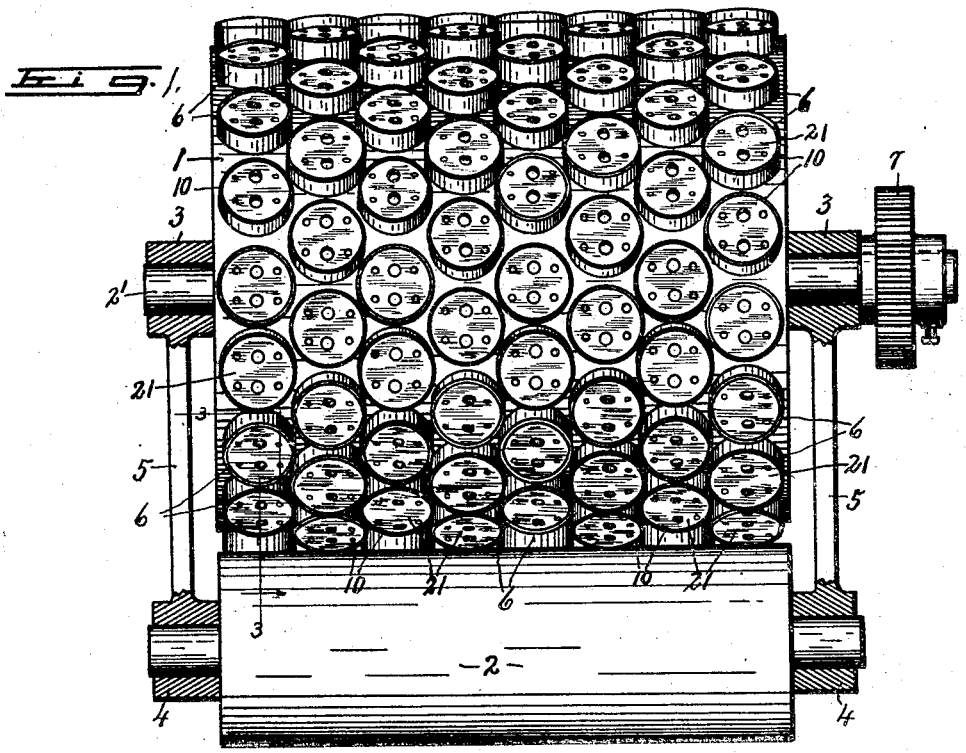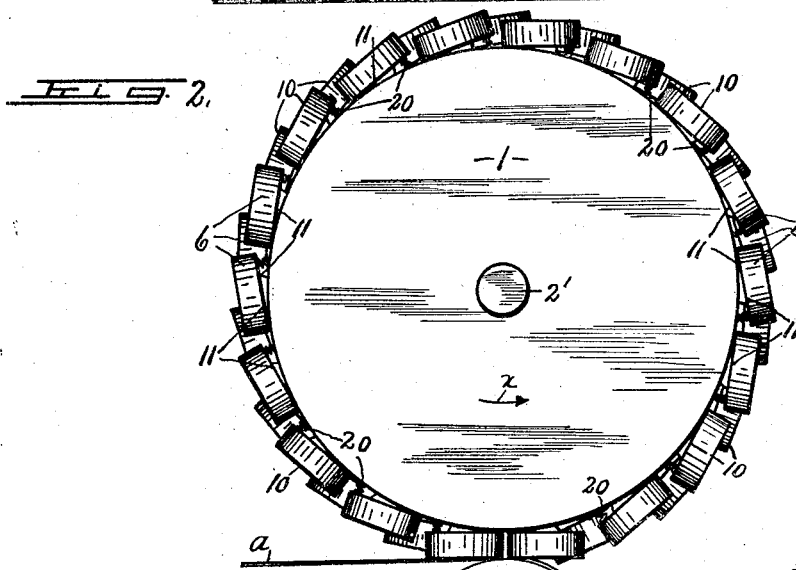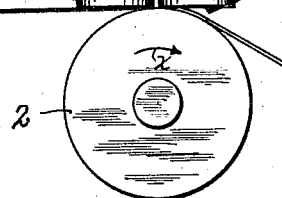

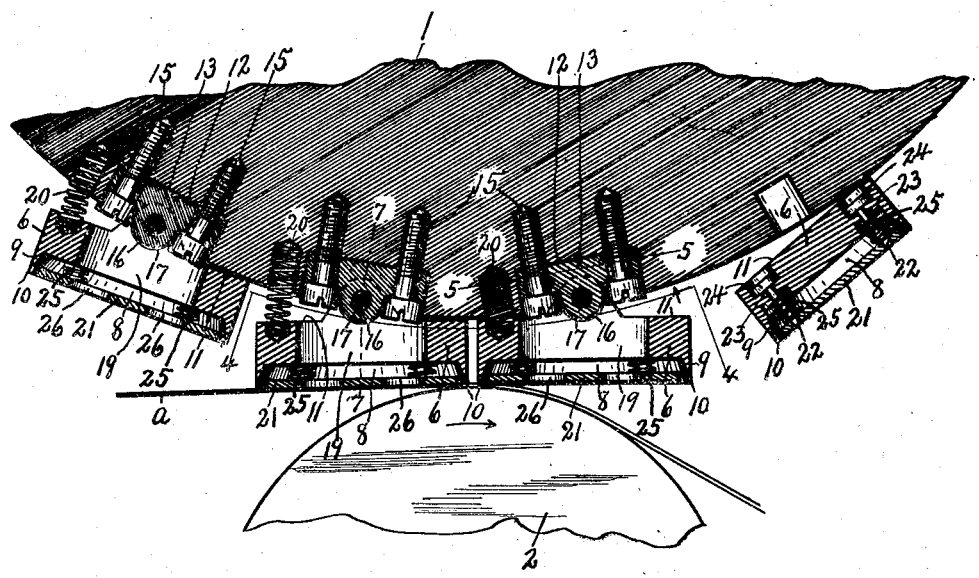
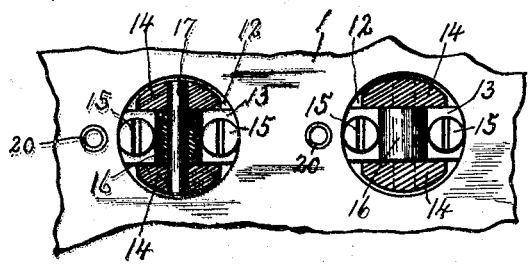

1,825,069

UNITED STATES PATENT OFFICE

OSCAR C. KAVLE, OF SYRACUSE, NEW YORK

STAMPING MACHINE

Application filed September 29, 1928. Serial No. 309,231.

This invention relates to a rotary stamping machine adapted to be used more particularly for stamping milk bottle caps and other circular disks from sheets of paper or other material but is equally useful in making circular prints or other impressions upon the sheet material as the latter is fed through the machine.

The main object is to provide a more expeditious and, therefore, more economical means for and method of manufacturing circular milk bottle caps and analogous disks from sheet material than has heretofore been practised and, therefore, to greatly increase the output of the material for a given period of time.

One of the specific objects is to cause the stamping or cutting dies to be fed by and between opposed rollers substantially tangential to the periphery of their contiguous faces so that all portions of their impression making or cutting sides will engage the work in a plane substantially normal to a direct line between the axes of the rollers thus permitting the use of circular dies of exactly the same diameters as the articles formed thereby.

I am aware that print or stamping rollers with dies secured to the peripheries thereof have heretofore been used for printing and stamping purposes, but in such cases the dies are usually secured in fixed relation to the rotary carrier and, therefore, their printing or stamping surfaces must be substantially concentric with the axis of rotation of the carrier in order to properly cooperate with the rotary platen for printing or stamping the work upon or from the sheets so that if the work is to be circular it is necessary to deform the printing or cutting faces of the dies to compensate for the difference between the length of the arcs of the printing or cutting faces and the direct distance between the ends of the printing or stamping faces in the direction of rotation.

When the dies are secured to the periphery of the rotary carrier in fixed relation thereto the diameter of the printing or cutting face of the die along the periphery thereof would have to be made somewhat shorter than the diameter lengthwise of the axis of the carrier. That is, the printing or cutting face of each die for producing circular work would have to be made elliptical which, of course, is more or less prohibitive by reason of the increased cost of production of the dies due to such deformation.

One of applicant's objects is to permit the use of the more economically produced circular dies by hingedly mounting the same upon the rotary carrier in such manner that they may be carried thereby to the printing or cutting position in a plane substantially tangential to the periphery of the rotary platen thereby assuring the gradual printing or cutting of the circular work from end to end in the direction of rotation of the contiguous faces of the rollers and yet maintaining a substantially radial thrust of the dies against the platen normal to its printing or cutting surface.

In other words, applicant has sought to obtain all of the advantages of the plunger-type stamping machines, together with the speed of production of stamping machines of the rotary type.

Other objects and uses relating to specific parts of the machine will be brought out in the following description.

In the drawings:

Figure 1 is a front face view of the portion of a rotary stamping machine embodying the various features of my invention.

Figure 2 is an end view of the same mechanism omitting the driving gear and showing a portion of a sheet material upon or from which the work is to be printed or cut.

Figure 3 is an enlarged sectional view, partly broken away, taken in the plane of line 3—3, Figure 1.

Figure 4 is a detail sectional view taken in the plane of line 4—4, Figure 3.

Figure 5 is also a detail sectional view taken in the plane of line 5—5, Figure 3.

Figure 6 is an outer end face view of one of the detached dies shown in Figure 3.

Figure 7 is a detail sectional view taken in the plane of line 7—7, Figure 3.

Figure 8 is a detail sectional view of one of the detached dies, the dotted lines indicating the peripheries of the lower and upper rollers.

Figures 9 and 10 are perspective views respectively of one of the die holders and one of the dies.

As illustrated, this machine comprises opposed rollers —1— and —2— journaled in suitable bearings —3— and —4— on a supporting frame —5— to rotate about parallel axes, preferably one above the other.

The roller —1— is relatively larger than the roller —2— and constitutes what may be termed a rotary die carrier for receiving and supporting a plurality of cutting or stamping dies —6— while the smaller roller —2— serves as a platen for receiving and supporting the sheet material as —a— from which the circular disks are to be cut or stamped by the dies —6— in a manner hereinafter described.

The peripheries of the rollers —1— and —2— are preferably concentric with their respective axes of rotation to form circular bearing surfaces against which the opposite faces of the dies —6— are adapted to roll, the surface area of the roller —1— being sufficient to receive and support a relatively large number of the dies —6— in more or less uniformly spaced relation circumferentially and longitudinally.

Any suitable means may be provided for rotating one or both of the rollers —1— and —2— but, as illustrated, rotary motion is transmitted from any available source of power to the roller —1— through the medium of a gear —7— on the shaft —2'— of said roller, the platen roller —2— being preferably rotated by contact of the dies —6— therewith as the roller —1— is rotated.

The peripheries of both rollers are preferably made of hardened steel or equivalent material for resisting the pressure required for pressing the dies in engagement with the platen with sufficient force to cut the disks from the sheet material.

The dies are constructed and mounted upon the roller —1— in such manner as to feed them in a plane tangential to the contiguous portions of the periphery of both rollers and, therefore, at right angles to a direct line between the axes of the rollers thereby combining the advantages of the plunger type of stamping machines with those of the rotary type, which latter is much more expeditious in the work turnout for a given period of time than the plunger type of machine by reason of the fact that the movement of the dies is practically continuous in one and the same direction whereas the plunger type must be more or less intermittent.

The several dies and the individual devices for attaching them to the roller —1— are identical in that each die comprises, in this instance, a circular body portion having its outer side provided with a circular chamber —8— forming an annular flange —9— which is beveled outwardly to form a circular cutting edge —10— adapted to engage the periphery of the roller platen —2— for cutting circular disks of corresponding diameter from the sheet material —a— as the latter is fed between the dies and contiguous face of the platen.

The inner side of the die —6— is provided with a substantially flat bearing surface —11— parallel with the outer cutting edges —10— and adapted to engage the periphery of the rotary carrier or roller —1— whereby the cutting faces of the dies will be forced against the periphery of the platen —2— as the rollers are rotated in the direction indicated by arrows —x—, Figure 2.

The distance between the cutting edge —10— and bearing surface —11— of each die is substantially equal to the distance between the contiguous faces of the rollers —1— and —2— in direct line between the axes of said rollers to assure the feeding of the dies and the sheet —a— by and between said rollers as the latter are rotated.

Suitable means is provided for causing the dies to be successively fed between the rollers in a plane tangential to the peripheries thereof as shown more clearly in Figures 2 and 8 and for this purpose the dies are hingedly connected to the rotary carrier —1— in uniformly spaced relation circumferentially and preferably in parallel circumferential rows as shown in Figure 1.

In order to establish hinge connections between the dies —6— and rotary carrier —1—, said carrier is provided with a multiplicity of similar recesses —12— opening through the peripheries thereof and arranged in uniformly spaced relation circumferentially and longitudinally, one for each die, for receiving a corresponding number of die supporting blocks —13— and lugs —14— projecting inwardly from the bearing faces —11—, as shown in Figure 7.

Each die supporting block —13— is removably secured to the carrier —1— within its corresponding recess —12— by means of a pair of clamping screws —15—, Figure 3, and is provided midway between its ends with an outwardly projecting apertured lug —16— for receiving a pivotal bolt —17— which is passed through registering slots —18— in the opposite lugs —14— of the die, as shown in Figures 7 and 8, said slots being elongated in the direction of the axis of the die —6— to permit inward and outward rocking movement of the die against the periphery of the roller —1— as indicated by the different positions of the dies in Figure 3 in transit to and from their cutting positions.

The recesses —12— in the peripheries of the roller —1— are preferably circular, as shown in Figure 4, while the die-supporting blocks —13— are of substantially the same length circumferentially of the roller as the diameter of their corresponding recesses so that the end walls of the recesses serve to assist the clamping bolts —15— in holding the die supporting blocks against endwise movement, said blocks being of less width in the direction of length of the axis of the roller —1— than the diameters of their corresponding recesses —12— and are arranged diametrically of and within said recesses so as to permit the lugs —14— on the inner ends of the dies to project into the recesses at opposite sides of the adjacent supporting blocks —13—.

The lugs —16— on the die-supporting blocks —13— extend a relatively short distance beyond the periphery of the roller —1— and also normally extend beyond the plane of the bearing surfaces —11— of the dies into complementary openings —19— in the central portions of the corresponding dies —6—, Figures 3 and 7, with just sufficient clearance to allow free rocking movement of the dies upon the periphery of the roller —1— and also free inward and outward movement relatively to the blocks —13— within the limits of the end walls of the slots —18—.

The dies —6— are yieldingly held in planes tangential to the periphery of the roller —1— by means of coiled springs —20— interposed between the roller —1— at one side of the die supporting blocks —13— and corresponding side of the die as shown in Figure 3, the opposite ends of the springs being seated in suitable sockets in the periphery of the roller —1— and adjacent faces of the dies.

For convenience of description, the contiguous faces of the rollers —1— and —2— and dies —6— carried by the roller —1— may be said to move forwardly in the direction indicated by arrows —x—, Figure 3, and with this understanding the springs —20— will be located at the rear of the pivotal pins —16— and, therefore, at the rear of the axes of the circular dies —6— thereby yieldingly holding the portions of the bearing surfaces —11— of the dies in front of the pivots —17— in tangential contact with the periphery of the roller —1—, it being understood that the spacing of the end walls of the slots —18— for the pivotal pins —17— will be sufficient to permit tangential contact of the bearing surfaces —11— of the dies with the periphery of the roller —1— as they are moved to different angles in transit to and from their stamping positions between the rollers —1— and —2—.

Suitable means is provided for ejecting the circular disks from their respective dies as said disks are successively cut from the sheet material —a— and for this purpose each die is provided with a substantially circular ejector plate —21— movable in the recess —8— in the cutting side of the die and provided with diametrically opposite inwardly projecting guide pins —2— extending loosely through openings —23— in the body of the die and having their inner ends provided with heads —24— which are movable in corresponding sockets in the inner face of the die to hold the ejector plate against undue outward movement as shown in the lower right hand of Figure 3.

These ejector plates —21— are yieldingly held in their outermost positions by coiled springs —25— interposed between said plate and the inner wall of the recess —8— and preferably surrounding the guide pins —22— which serve to hold the springs against lateral displacement.

Each ejector plate is provided with openings —26— therethrough to permit the entrance of a screw driver or similar tool by which the screws —15— are tightened or loosened in the operation of displacing or replacing the die supporting block —13—.

Operation

During the rotation of the die carrier —1— in the direction indicated by arrows —x—, Figure 2, the dies will be carried in the same direction between and in contact with the periphery of the rollers —1— and —2— in a plane tangential to said peripheries as shown in Figure 3 while the sheet material —a— is fed between the cutting faces of the dies and contiguous face of the platen roller —2— thereby effecting the cutting of circular disks from the sheet as the dies and sheet are fed between the rollers.

During this cutting operation of the disks the latter will, of course, engage the ejector plates —21— and force the same inwardly against the action of the springs —25— and as soon as the dies pass beyond the contiguous faces of the rollers —1— and —2— the disks cut by the several dies will be automatically ejected from said dies by the outward movement of the ejector plates —21— due to the action of the springs —25—, these operations being continued during the continuous rotation of the rollers and continuous feeding of the sheet material —a— between the dies and platen roller —2—.

It will be seen from the foregoing description and the accompanying drawings that the die carrier —1— and platen —2— may be rotated continuously at high speed which together with the relatively large number of dies carried by the roller —1— enables the operator to turn out an extremely large amount of work in a relatively short time with the assurance that all of the disks cut from the sheet material will be uniform.

It will be evident, however, that various changes may be made in the form of the die and method of mounting the same and that other dies for printing or cutting purposes may be substituted and operated in a similar manner without departing from the spirit of this invention.

What I claim is:

1. In a machine for stamping disks from sheet material, a rotary platen-element, a rotary die-carrying element having its die tiltably mounted thereon and adapted to be fed thereby between and in contact with both of said elements tangential to the contiguous faces thereof.

2. In a machine for stamping disks from sheet material, opposed rollers, and dies carried by one of the rollers to pass between the contiguous faces of both rollers in contact therewith and tiltable relatively to said faces to a plane tangential thereto while passing between them.

3. In a machine for stamping disks from sheet material, opposed rollers having cylindrical bearing surfaces in spaced relation, a die having its opposite faces disposed in parallel planes a distance apart corresponding to the space between said bearing surfaces, and connections between one of the rollers and die for feeding the latter tangentially between the contiguous bearing surfaces of both rollers with its opposite faces in contact therewith.

4. In a stamping machine, a rotary element having a cylindrical bearing surface concentric with its axis of rotation, a die mounted on said bearing surface and tiltable thereon, means for urging the die to tilt in the direction of rotation of said element, and a platen cooperating with the moving die and across which the work is fed to receive the impression of the die.

5. In a stamping machine, a rotary element having a cylindrical bearing surface concentric with its axis of rotation, a die mounted on said bearing surface and tiltable thereon, means for urging the die to tilt in the direction of rotation of said element, and a platen cooperating with the moving die and across which the work is fed to receive the impression of the die, said die being free to rock on said cylindrical bearing surface to allow it to assume a position substantially tangential to the cylindrical bearing surface during its transit across the platen.

6. In a stamping machine, a rotary element having a cylindrical bearing surface concentric with its axis of rotation, a die hinged to said rotary element to permit the die to rock thereon and having a flat surface adapted to engage said bearing surface when the die is rocked, and a rotary work-supporting-platen cooperating with the die for holding the work against the die.

7. In a machine for cutting circular disks from sheet material, opposed rollers in parallel spaced relation, and dies hingedly mounted on one of the rollers to swing about axes parallel with the axis of said roller and to be carried thereby between the rollers, said dies having circular cutting faces adapted to impinge against the periphery of the other roller as they pass between the rollers, the sheet material being fed by and between the cutting faces of the dies and adjacent roller.

8. In a machine for making circular disks from sheet material, a rotary carrier having a concentric peripheral surface, a rotary platen parallel with and in spaced relation to the carrier for supporting said sheet material, and dies tiltably mounted upon said carrier and provided with flat faces in rolling contact with said peripheral surface, said dies having cutting faces disposed in planes parallel with the flat faces and cooperating with the platen for cutting disks from the sheet material as the dies are carried between the carrier and platen.

9. In a machine for making circular disks from sheet material, cooperative rollers rotatable about parallel axes in spaced relation, and dies hingedly mounted on one of the rollers to move therewith into engagement with the other roller for cutting the disks, the sheet material being fed by and between the last-named roller and adjacent face of the die.

In witness whereof I have hereunto set my hand this 21st day of September, 1928.

OSCAR C. KAVLE.